United States Patent [19]

Sorg et al.

[11] Patent Number: 4,811,625
[45] Date of Patent: Mar. 14, 1989

[54] ENERGY CONSERVATOR

[75] Inventors: James F. Sorg, Elizabeth; Leo L. Sorg, North Vernon, both of Ind.

[73] Assignee: J & L Sorg Enterprises, Inc., Elizabeth, Ind.

[21] Appl. No.: 98,867

[22] Filed: Sep. 21, 1987

[51] Int. Cl.[4] ............................................ F16F 15/10
[52] U.S. Cl. ...................................................... 74/572
[58] Field of Search ................ 74/572, 573 R, 573 F, 74/64

[56] References Cited

U.S. PATENT DOCUMENTS

| 1,974,108 | 9/1934 | Heinzelmann | 74/64 |
| 3,424,026 | 1/1969 | Vaughn | 74/572 |
| 4,019,396 | 4/1977 | Frechette | 74/572 X |

FOREIGN PATENT DOCUMENTS

| 99120 | 1/1925 | Austria | 74/64 |
| 953126 | 8/1974 | Canada | 74/572 |
| 549167 | 4/1932 | Fed. Rep. of Germany | 74/572 |
| 506746 | 8/1920 | France | 74/572 |
| 1152780 | 2/1958 | France | 74/64 |
| 1210652 | 3/1960 | France | 74/64 |
| 445749 | 2/1949 | Italy | 74/572 |
| 58-91951 | 6/1983 | Japan | 74/573 R |

Primary Examiner—Gary L. Smith
Assistant Examiner—Rodney M. Lindsey
Attorney, Agent, or Firm—Woodard, Emhardt, Naughton, Moriarty & McNett

[57] ABSTRACT

An energy conserving flywheel having a plurality of weights mounted on the periphery thereof. A wheel mounted to an axle is rotatable therewith. A plurality of lift arms are rotatably mounted by clutches at the circumference of the wheel and rotate only in a direction opposite to the rotation of the wheel. Each lift arm includes a first weighted end and an opposite second end having a roller thereon. The weights are spaced at equal intervals around the circumference of the wheel with each weight having a mating weight located diagonally therefrom. An upper timing cam contacts the rollers of each weight forcing the weighted end outwardly of the wheel circumference whereas a slower timing cam contacts the roller ends forcing the weighted ends inwardly. The two timing cams cooperatively cycle the weighted ends outward and inward once per revolution of the wheel.

5 Claims, 3 Drawing Sheets

ENERGY CONSERVATOR

FIELD OF THE INVENTION

This device is in the field of products for conserving energy. A variety of different types of flywheels have been invented to achieve two main objectives. First, a rotating object may absorb energy from a power source during the greater portion of its revolution and then deliver the energy as useful work during the remaining portion of its revolution. Second, a rotating object such as a flywheel mounted to an engine smooths out the speed fluctuations resulting from the power inputs from the engine's cylinders. In either case, the rotating flywheel receives and stores energy thereby conserving the energy.

An early attempt at a rotatable machine designed by Leonardo da Vinci included a plurality of small weights mounted to the circumference of a rotating flywheel for conserving energy. The theory of such a machine was that the weights would flail or move outwardly of the rotating flywheel thereby conserving energy. Once the flywheel reached a constant state of rotation, the smaller weights remained at the outermost position thereby simply increasing the overall effective diameter of the flywheel. We have intended and disclosed herein a rotating flywheel including a plurality of small weights mounted to the circumference thereof which are caused to move outward and then inward of the flywheel circumference for each revolution thereof thereby increasing efficiency and avoiding some of the problems inherent in the earlier design of Leonardo da Vinci.

SUMMARY OF THE INVENTION

One embodiment of the present invention is a device comprising a main frame, axle means mounted to the main frame, first flywheel means on the axle means and rotatable in a first direction about a first axis of rotation, first holding means mounted circumferentially to the flywheel means and operable to direct rotation in a second direction opposite to the first direction and about a plurality of second axis of rotation parallel to the first axis, the plurality of second axis of rotation arranged equidistant from the first axis of rotation defining a circular course, first guide means positioned adjacent the first holding means and defining a path, and, first energy conserving means including a plurality of supports mounted to the holding means, the supports including a plurality of first ends of equal weight and a plurality of second opposite ends engageable with the guide means to follow the path operable to rotate the first ends in the second direction positioning each of the first ends outwardly and then inwardly of the circular course in cyclic fashion per revolution of the flywheel means.

It is an object of the present invention to provide a device for conserving energy.

A further object of the present invention is to provide a rotatable flywheel whose motion is controllable.

Related objects and advantages of the present invention will be apparent from the following description.

DESCRIPTION OF THE PREFERRED EMBODIMENTS

Figure 1:
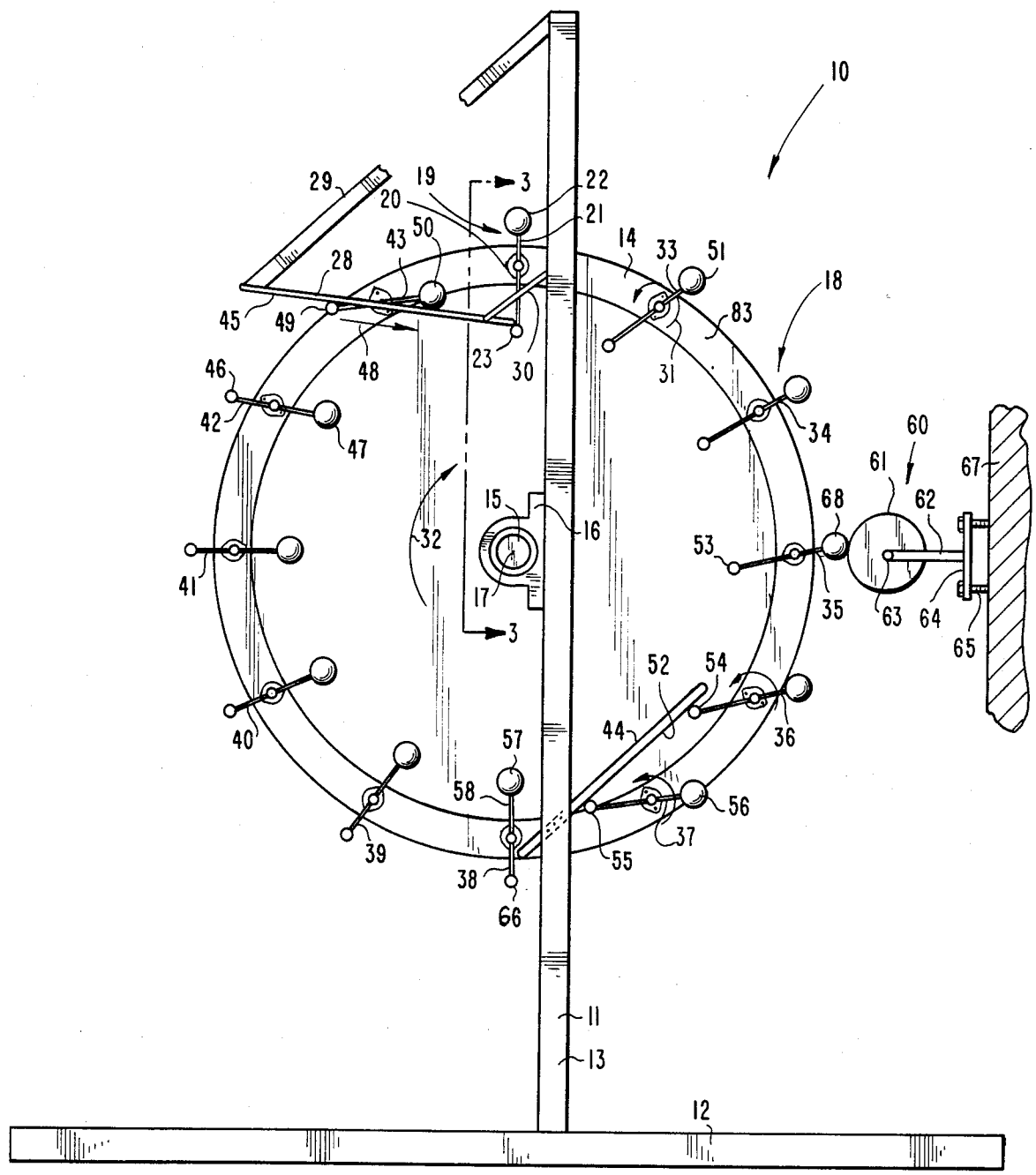
FIG. 1 is a fragmentary side view of the device incorporating our present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown the device 10 which is the preferred embodiment of the present invention. The device includes a main frame 11 having a base 12 fixedly secured to the floor and having a upright member 13 affixed thereto. Wheel 14 is fixedly mounted to axle 15 in turn rotatably received by bearing housing 16 affixed to the side of upright 13. Housing 16 includes conventional bearings allowing the axle 15 to rotate about a horizontal axis of rotation 17 extending through the center of the axle.

Figure 3:
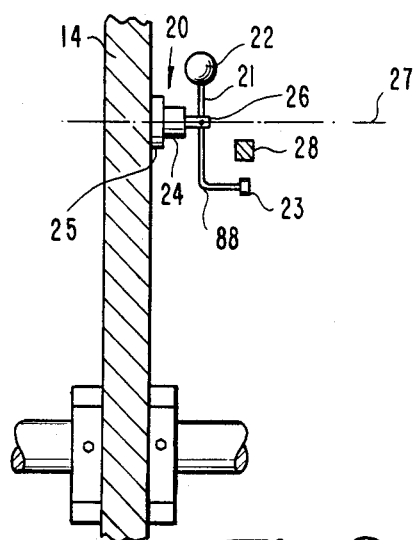
FIG. 3 is an enlarged fragmentary cross-sectional view taken along a line and viewed in the direction of the arrows 3—3 of FIG. 1.
Figure 2:
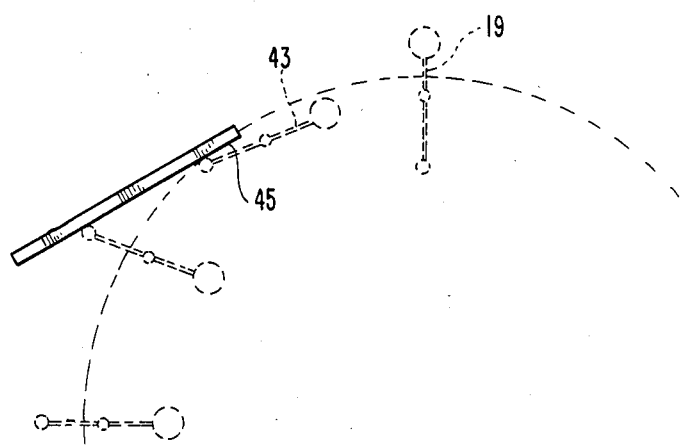
FIG. 2 is a schematic representation of the movement of the smaller weights as they are rotated from a most inward position to a most outward position as the flywheel rotates.

A plurality of identical rotating weights 18 are mounted to the circumference of wheel 14. Weight 19 will be described it being understood that a similar description applies to the remaining weights. Weight 19 includes a holder 20 fixedly mounted to the periphery of wheel 14. The holder mountingly receives a rod 21 having at one end weight 22 and at its opposite end a roller 23. Holder 20 includes a conventional spray clutch 24 (FIG. 3) fixedly mounted by flanges 25 bolted to wheel 14. A conventional spray clutch is available from Dana Corporation, P.O. Box 68790, Indianapolis, Ind. 46268. Clutch 24 has an outer race fixedly secured to wheel 14 and an inner race fixedly secured to axle 26 with suitable bearings being located between the inner and outer race and conventional means to allow rotation of axle 26 in only one direction about its axis of rotation 27. Axle 26 includes a hole extending perpendicularly therethrough and across axis 27 with the hole slidably receiving rod 21 having the weight 22 and roller 23 mounted to its opposite ends. A suitable fastening device is secured to axle 26 and extends into the hole receiving rod 21 with the fastening device abutting rod 21 and preventing relative motion between rod 21 and axle 26. The fastening device may be loosened in order to adjust the distance between axis 27 and weight 22 with the fastening device then being tightened thereby preventing further relative motion. As a result, all weighted ends may be positioned equal distances from their respective axis of rotation. End 88 is fashioned at a right angle to position roller 23 rotatably mounted thereon away from wheel 14 to engage an upper timing cam 28 fixedly secured by supports 29 and 30 projecting outwardly from and mounted to upright 13.

The plurality of weights 18 freely rotate about each axis of rotation 27 extending horizontally outward from the twelve spray clutches. The sprag clutches are operable to allow the weights to rotate only in a counter-clockwise direction depicted by arrow 31 whereas flywheel 14 is rotatable in a clockwise direction as depicted by arrow 32. The number of weights may be varied on wheel 14 so long as there are a number of even weights and the weights are positioned diagonally opposite. That is, twelve such weights are depicted in the embodiment shown in FIG. 1 with weights 19, 33, 34, 35, 36 and 37 being positioned diagonally opposite respectively to weights 38, 39, 40, 41, 42 and 43. As such, the weights are angularly positioned every 30 degrees around the horizontal axis 17 of wheel 14.

Two timing cams are provided to guidingly control the positioning of the weights with the upper timing cam 28 forcing the weighted end outwardly whereas the lower timing cam 44 positions the weighted end inwardly. Upper timing cam 28 has a downwardly facing surface 45 defining a path upon which the roller end of each weight will contact and follow as wheel 14 rotates in the direction of arrow 32. For example, as the roller end 46 of weight 42 approaches timing cam 28, the weighted end 47 is positioned inwardly with respect to the circumference of the wheel 14. Continued clockwise rotation of wheel 14 will eventually cause roller end 46 to contact the downwardly facing surface 45 and ride along the surface in the inward direction shown by arrow 48. Thus, weight 43 is shown as having its roller end 49 in contact with surface 45 thereby causing the weighted end 50 to pivot outwardly in a counter-clockwise direction until the roller end disengages surface 45. Thus, the roller end 23 of weight 19 has disengaged surface 45 thereby positioning weighted end 22 in its most outer position with rod 21 extending radially inward to the axis of rotation 17 of axle 15. Continued rotation of wheel 14 causes the weighted ends to remain outwardly assisting the rotation of wheel 14. Thus, the enlarged end 51 of weight 33 is shown located outward of the circumference of the wheel.

The lower timing cam 44 has a downwardly facing surface 52 for engaging the roller ends of the weight thereby causing further counter-clockwise rotation of the weights and forcing the weighted ends to rotate inwardly. Thus, as the roller end 53 of weight 35 moves downwardly with wheel 14, the roller end will contact surface 52 as shown by roller end 54 of weight 36. Surface 52 defines a second path upon which the roller ends follow thereby causing counter-clockwise rotation of the weights. Thus, roller end 55 of weight 37 is shown midway along the path defined by surface 52 with the weighted end 56 shown as rotating inward so that eventually the weighted end is positioned in the most inward position. Roller end 66 of weight 38 is shown as having moved past surface 52 thereby positioning weighted end 57 in the most inward position with rod 58 extending radially inward to intersect the axis of rotation 17 of wheel 14. Continued rotation of the wheel causes the roller end to again contact the upper timing cam and repeat the cycle. As such, the weights mounted to the circumference of the wheel rotate in a direction opposite of the rotation of the wheel and move from a most outward position to a most inward position and back for each revolution of the wheel assisting the rotation of wheel 14.

An optional feature of the embodiment of the device depicted in FIG. 1 is a positioning means 60 to properly orient the roller ends of the weights to engage surface 52. Positioning means 60 includes a wheel 61 rotatably mounted about axle 63 to a cantilevered mounted elongated member 62 fixedly secured to plate 64. Plate 64 is adjustable to and from stationary means 67 by conventional fastening devices 65. Wheel 61 is adjusted to and from the weighted ends to engage the weighted ends and impart a slight counter-clockwise motion to the weights thereby orienting the roller ends to be received by the path defined by surface 52. Weight 18 which is the weight immediately above positioning means 60 is oriented to extend radially outward from axle 15. Thus it is conceivable under certain conditions that the roller end of weight 18 would strike the end of lower timing cam 44 in lieu of surface 52 preventing further rotation of wheel 14. To prevent such an eventuality, wheel 61 lightly contacts the weighted end 68 imparting a slight counter-clockwise motion orienting weight 35 to not extend radially outward from axle 15, but instead to be slightly askew insuring roller end 53 contacts surface 52.

Figure 4:
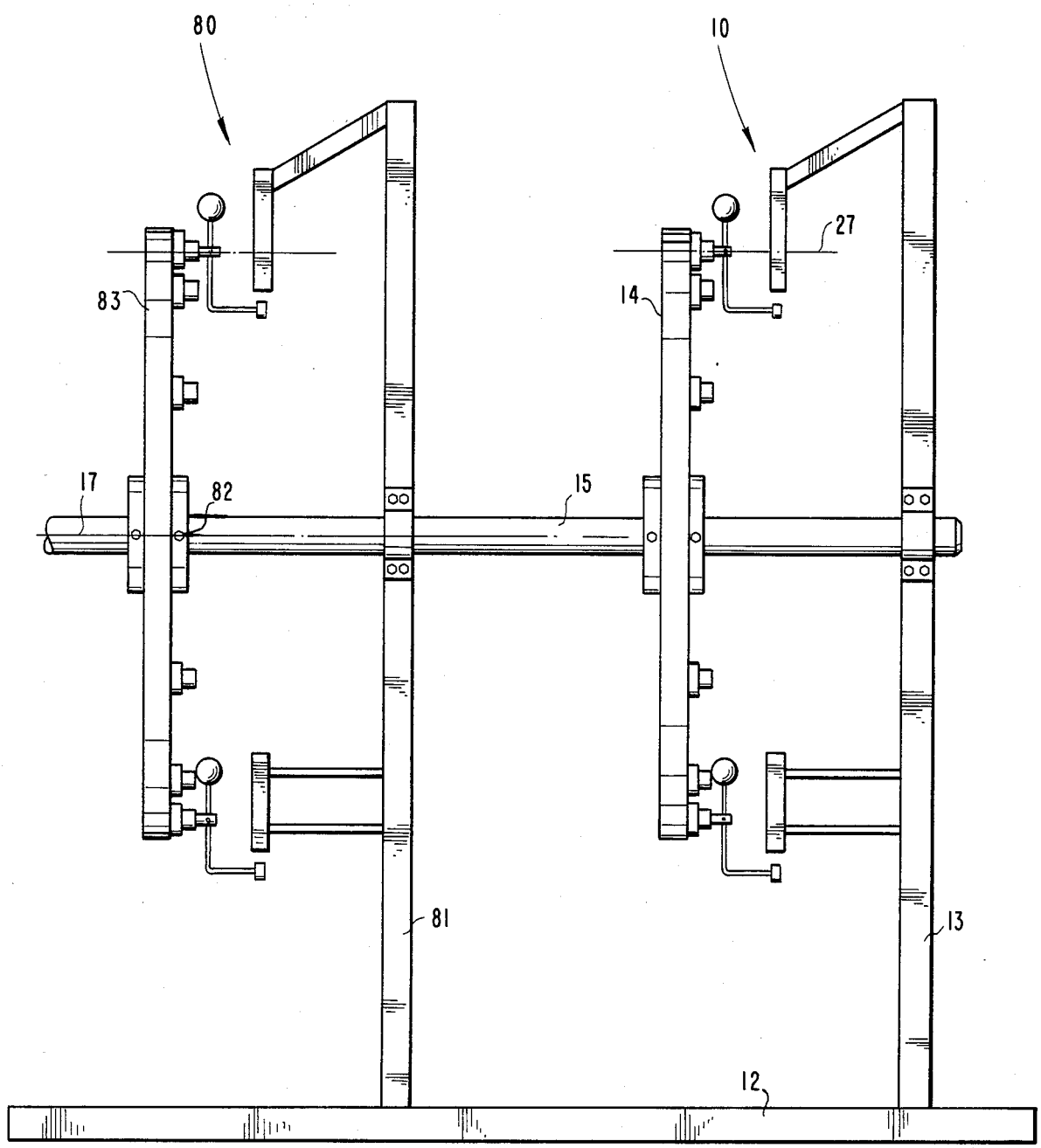
FIG. 4 is an end view of an alternate embodiment of a device incorporating the present invention.

In an alternate embodiment depicted in FIG. 4, there is shown a second device 80 identical to device 10 previously described. Device 80 includes a rotatable wheel 83 fixedly secured by conventional fastening device 82 to axle 15 to rotate with the axle along with wheel 14. Axle 15 is rotatably mounted to a pair of uprights 13 and 81 and is received in bearings previously described. The uprights 13 and 81 are fixedly secured to base 12. With a plurality of wheels identical to wheel 14 mounted to a single axle, it is possible to continue the rotation of axle 15 even though one of the wheels are temporarily immobilized for repair purposes. For example, if wheel 83 is defective, then fastener 82 may be loosened allowing continued rotation of axle 15 with wheel 14. The repairs can then be made to wheel 83 and fastener 82 subsequently retightened to allow further rotation of wheel 83 with the axle and wheel 14. In all respects, wheel 83 along with its plurality of rotating weights and timing cams are identical to that described for device 10. FIG. 4 does not depict all of the rotating weights for the purpose of clarity.

The device disclosed herein may be produced from a variety of materials. In one embodiment, wheel 14 is produced from wood and has a metal rim 83 fixedly secured thereon and extending around the circumference thereof. The plurality of rotating weights are mounted to rim 83.

All of the weighted ends are of equal weight. For example, weighted end 22 is equal to weighted end 51. The sprag clutches hold the weighted ends and roller ends in desired position in relation to wheel 14 with the roller ends traveling along the path defined by the lower timing cam 44 which allows the sprag clutches to free wheel until the weighted ends are in the inward or the desired inverted position. The sprag clutches then hold the weighted ends in the inward or inverted position until the roller ends contact surface 45 of the upper timing cam 28 which causes the weighted end to then move to the outward positions.

The positioning means 60 adjusts the roller ends into proper position by slowing the weighted ends in relation to wheel 14 causing the sprag clutch to free wheel slightly and adjust the roller ends downwardly. Positioning means 60 is located at the same elevation as the axis of rotation 17 and thus contacts weight 35 when the weight is midway between the top and bottom portions of wheel 14. Normally, rod 21 of such weight 35 extends radially outward from axis 17, but is adjusted at an approximate 5 degree downward angle relative to horizontal once weighted end 68 contacts wheel 61.

Many variations are contemplated and includes in the present invention. For example, an upper timing cam 28 is depicted as separate from the lower timing cam 44; however, it is to be understood that both timing cams may be combined into a single timing cam defining paths which follow surfaces 45 and 52. The continual movement of the weighted ends from the outward to the inward position creates a constant unbalanced flywheel that rotates in a manner similar to a water wheel. An alternate embodiment includes multiple rows of weights positioned on the oppositely facing sides of the wheel increasing the rotation of the wheel. The timing cams adjust the weights into proper position with little loss of energy since the weight is almost balanced at top center and most of the weight is directed downward. All weights must be exactly the same amount and evenly and alternatively spaced on both sides of the flywheel for balance in relation to axis 17. The larger the flywheel and the more weights that are added thereto, the more efficient the device becomes. Rotation of the flywheels fixedly mounted to axle 15 allows the energy to be directed through axle 15 for an external use coupled to the axle.

In order to obtain satisfactory operation, it is necessary to balance the plurality of weights around the circumference of wheel 14. Thus, each weight must have a mating weight located in the opposite quadrant about the first axis of rotation. Likewise, the upper timing cam and the lower timing cam are positioned respectively above and below the axis of rotation of wheel 14 and are also positioned in diagonally opposite quadrants. The plurality of weights follow the paths of the upper and lower timing cams positioning the weighted ends outwardly and then inwardly of the circular course through which the flywheel rotates in cyclic fashion for each revolution of the wheel thereby forwarding rotation of the wheel.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A device comprising:
a main frame;
axle means mounted to said main frame;
first flywheel means on said axle means and rotatable in a first direction about a first axis of rotation;
first holding means mounted circumferentially to said flywheel means and operable to direct rotation in a second direction opposite to said first direction and about a plurality of second axis of rotation parallel to said first axis, said plurality of second axis of rotation arranged equidistant from said first axis of rotation defining a circular course;
first guide means positioned adjacent said first holding means and defining a path;
first energy conserving means including a plurality of supports mounted to said holding means, said supports including a plurality of first ends of equal weight and a plurality of second opposite ends engageable with said guide means to follow said path operable to rotate said first ends in said second direction positioning each of said first ends outwardly and then inwardly of said circular course in cyclic fashion per revolution of said flywheel means; and wherein:
said holding means allows rotation of said supports in said second direction and limits movement about said plurality of second axis of rotation; and,
said holding means includes a plurality of clutches mounted at each of said plurality of second axis of rotation limiting rotational movement about said plurality of second axis, said holding means includes adjustment means on said clutches receiving each support to allow each first ends of equal weight to be positioned equal distances from respective of said second axis of rotation.

2. A device comprising a main frame;
axle means mounted to said main frame;
first flywheel means on said axle means and rotatable in a first direction about a first axis of rotation;
first holding means mounted circumferentially to said flywheel means and operable to direct rotation in a second direction opposite to said first direction and about a plurality of second axis of rotation parallel to said first axis, said plurality of second axis of rotation arranged equidistant from said first axis of rotation defining a circular course;
first guide means positioned adjacent said first holding means and defining a path;
first energy conserving means including a plurality of supports mounted to said holding means, said supports including a plurality of first ends of equal weight and a plurality of second opposite ends engageable with said guide means to follow said path operable to rotate said first ends in said second direction positioning each of said first ends outwardly and then inwardly of said circular course in cyclic fashion per revolution of said flywheel means; and wherein:
said guide means defines a first guide and a second guide with said first guide receiving and directing said second opposite ends circumferentially outward of and said first ends circumferentially inward of said circular course and with said second guide receiving and direction said second opposite ends circumferentially inward of and said first ends circumferentially outward of said circular course and further comprising:
contact means mounted adjacent said main frame and positioned to contact each of said first ends of equal weight between said first guide and said second guide and rotate each support in said second direction positioning said second opposite ends to engage said first guide as said flywheel means rotates.

3. An apparatus comprising:
a frame;
an axle with a first axis of rotation rotatably mounted to said frame;
a wheel mounted on said axle and rotatable therewith in a first direction about said first axis of rotation;
a plurality of holders mounted on said wheel equidistant from said axle defining a circular course, said holders rotate only in a second direction opposite to said first direction and about a plurality of second axis of rotation parallel to said first axis;
guide means positioned adjacent said holders and defining a path;
a plurality of arms mounted to said holders and including a plurality of first ends of equal weight and a plurality of second opposite ends engageable with said guide means to follow said path to rotate said first ends in said second direction positioning each of said first ends outwardly and then inwardly of said circular course in cyclic fashion per revolution of said wheel forwarding rotation of said wheel; and wherein:

said guide means defines a first guide and a second guide with said first guide receiving and directing said second opposite ends circumferentially outward of and said first ends circumferentially inward of said circular course and with said second guide receiving and directing said second opposite ends circumferentially inward of and said first ends circumferentially outward of said circular course;

said holders allow rotation of said arms in said second direction and limits movement about said plurality of second axis of rotation; and, said holders include a plurality of clutches mounted at each of said plurality of second axis of rotation limiting rotational movement about said plurality of second axis, said holders includes adjustment means on said clutches receiving each arm to allow each first ends of equal weight to be positioned equal distances from respective of said second axis of rotation.

4. A device comprising:

a main frame;

axle means mounted to said main frame;

first flywheel means on said axle means and rotatable in a first direction about a first axis of rotation;

first holding means mounted circumferentially to said flywheel means and operable to direct rotation in a second direction opposite to said first direction and about a plurality of second axis of rotation parallel to said first axis, said plurality of second axis of rotation arranged equidistant from said first axis of rotation defining a circular course;

first guide means positioned adjacent said first holding means and defining a path;

first energy conserving means including a plurality of supports mounted to said holding means, said supports including a plurality of first ends of equal weight and a plurality of second opposite ends engageable with said guide means to follow said path operable to rotate said first ends in said second direction positioning each of said first ends outwardly and then inwardly of said circular course in cyclic fashion per revolution of said flywheel means; and wherein:

said holding means allows rotation of said supports in said second direction and limits movement about said plurality of second axis of rotation, said holding means includes a plurality of means mounted at each of said plurality of second axis of rotation limiting rotational movement about said plurality of second axis.

5. The device of claim 4 wherein:

said holding means includes means to position each first ends of equal weight equal distances from respective of said second axis of rotation.

* * * * *